United States Patent [19]

Shiono et al.

[11] Patent Number: 5,506,302
[45] Date of Patent: Apr. 9, 1996

[54] ORGANOPOLYSILOXANE COMPOSITION AND RUBBER SUBSTRATE HAVING A COATING THEREOF

[75] Inventors: Mikio Shiono, Annaka; Kazumi Okada, Takasaki; Hironao Fujiki, Takasaki, all of Japan

[73] Assignee: Shin-Etsu Chemical Co., Inc., Tokyo, Japan

[21] Appl. No.: 493,154

[22] Filed: Jun. 21, 1995

Related U.S. Application Data

[63] Continuation-in-part of Ser. No. 304,027, Sep. 9, 1994, abandoned.

[30] Foreign Application Priority Data

Sep. 10, 1993 [JP] Japan .................................. 5-250159
Mar. 24, 1995 [JP] Japan .................................. 7-091865

[51] Int. Cl.$^6$ ...................................................... C08K 5/54
[52] U.S. Cl. ...................... 524/731; 524/861; 524/789; 525/478; 525/104; 525/106; 525/405; 525/446; 525/464
[58] Field of Search ........................ 524/861, 789, 524/731; 525/478, 104, 106, 405, 446, 464

[56] References Cited

U.S. PATENT DOCUMENTS 5,166,296  11/1992  Wengrovius et al. ...................... 528/18
5,173,529  12/1992  Fujiki et al. .............................. 524/188

*Primary Examiner*—Melvyn I. Marquis
*Attorney, Agent, or Firm*—Millen, White, Zelano & Branigan

[57] ABSTRACT

An organopolysiloxane composition contains (A) a both end hydroxyl-blocked diorganopoly-siloxane, (B) a hydroxyl-free diorganopoly-siloxane having a degree of polymerization equal to or greater than that of (A), (C) an organohydrogenpolysiloxane having at least three hydrogen atoms in a molecule, (D) an organosilane containing at least two alkoxy groups and an amino group attached to a silicon atom through an alkylene group in a molecule and/or a partial hydrolyzate thereof, (E) a fatty acid metal salt, (F) polycarbonate powder having a mean particle size of up to 50 μm, and optionally (G) an organo-silane containing at least two alkoxy groups and a mercapto group attached to a silicon atom through an alkylene group in a molecule and/or a partial hydrolyzate thereof. It is applied to a rubber substrate to form a wear resistance coating thereon.

4 Claims, No Drawings

ORGANOPOLYSILOXANE COMPOSITION AND RUBBER SUBSTRATE HAVING A COATING THEREOF

CROSS REFERENCE TO RELATED APPLICATION

This application is a continuation-in-part of application Ser. No. 08/304,027 filed on Sep. 9, 1994, now abandoned, the entire contents of which are hereby incorporated by reference.

BACKGROUND OF THE INVENTION

1. Field of the Invention

This invention relates to an organopoly-siloxane composition for use in imparting non-tackiness, water repellency, lubricity and wear resistance to rubber surface, and more particularly, to an organopolysiloxane composition for use in surface treatment of rubber to form a durably wear resistance coating thereon. It also relates to a rubber substrate having a coating of the composition.

2. Prior Art

Inert silicone oil and various curable organopolysiloxane compositions have been used for imparting non-tackiness and water repellency to rubber surface.

The inert silicone oil has high initial wear properties, but does not last long since it is readily shed from the substrate surface by physical action as weak as water washing.

The curable organopolysiloxane compositions used heretofore are typically those containing a both end hydroxyl-blocked diorganopolysiloxane, a Si—H group-containing organopolysiloxane and/or an organoalkoxysilane, and an organic tin compound. These compositions form on the substrate surface coatings which are acceptably tack-free and water repellent, but poor in lubricity and wear resistance. It is possible to improve adhesiveness with a substrate, lubricity and wear resistance by adding a mixture or reaction product of an organopolysiloxane having an epoxy group such as glycidoxy group and epoxycyclohexyl group and alkoxysilane or siloxane having an amino group (Japan Kokoku Nos. 54-43023, 56-19813 and 56-47864), but the improvement is not yet fully attained. It is also possible to improve lubricity and wear resistance by adding inert silicone to such organopolysiloxane compositions (Japan Kokoku No. 4-80072), but the coatings are not satisfactorily durably wear resistant where frictional forces are repeatedly applied. There is a strong desire for improving coatings to be durably wear resistant.

SUMMARY OF THE INVENTION

Therefore, an object of the present invention is to provide an organopolysiloxane composition which forms a tack-free, water repellent, lubricating and wear resistant coating on a rubber surface after curing. Another object of the present invention is to provide a rubber substrate having a coating of the composition.

The present invention provides an organopolysiloxane composition comprising (A) a diorganopolysiloxane of the following general formula:

$$HOR^1_{\frac{1}{2}}SiO[R^1_{\frac{1}{2}}SiO]_m SiR^1_{\frac{1}{2}}OH \tag{1}$$

wherein $R^1$ is a monovalent substituted or unsubstituted hydrocarbon group and letter m is an integer of at least 150, (B) a diorganopolysiloxane of the following general formula:

$$R^2_{\frac{2}{3}}SiO[R^2_{\frac{2}{3}}SiO]_n SiR^2_{\frac{2}{3}} \tag{2}$$

wherein $R^2$ is a monovalent substituted or unsubstituted hydrocarbon group and letter n is an integer equal to or greater than m, (C) an organohydrogenpolysiloxane having at least three hydrogen atoms each attached to a silicon atom in a molecule, (D) an organosilane containing at least two alkoxy groups each attached to a silicon atom and a substituted or unsubstituted amino group attached to a silicon atom through an alkylene group in a molecule, a partial hydrolyzate thereof, or a mixture thereof, (E) a metal salt of a fatty acid, and (F) fine powder having a mean particle size of up to 50 μm, wherein the fine powder is selected from the group consisting of finely divided synthetic resins, finely divided rubbers and finely divided inorganic materials.

Preferably, the organopolysiloxane composition further comprises (G) an organosilane containing at least two alkoxy groups each attached to a silicon atom and a mercapto group attached to a silicon atom through an alkylene group in a molecule, a partial hydrolyzate thereof, or a mixture thereof.

Also contemplated herein is a rubber substrate having a coating of a cured product of the organopolysiloxane composition defined above.

Briefly stated, we have found that a cured coating is improved not only in non-tackiness, water repellency and lubricity, but in wear resistance durability by combining a both end hydroxyl-blocked diorganopolysiloxane of formula (1) with a diorganopolysiloxane having a degree of polymerization equal to or greater than that of the diorganopolysiloxane of formula (1) and free of a hydroxyl group in a molecule and fine powder having a mean particle size of up to 50 μm.

DETAILED DESCRIPTION OF THE INVENTION

The organopolysiloxane composition of the invention is substantially comprised of components (A) to (F), preferably components (A) to (G). These components are described in detail.

Component (A) is a both end hydroxyl-blocked diorganopolysiloxane of the general formula (1). It is a main component to form a coating with its hydroxyl groups reacting with a Si—H group of component (C) and alkoxy groups of component (D) or components (D) and (E) for curing.

$$HOR^1_{\frac{1}{2}}SiO[R^1_{\frac{1}{2}}SiO]_m SiR^1_{\frac{1}{2}}OH \tag{1}$$

In formula (1), $R^1$ is a monovalent substituted or unsubstituted hydrocarbon group. It is preferably selected from hydrocarbon groups having 1 to 8 carbon atoms, more preferably 1 to 6 carbon atoms, for example, alkyl groups such as methyl, ethyl, propyl, iso-propyl, butyl, iso-butyl, ter-butyl, pentyl, neo-pentyl, hexyl and cyclohexyl, alkenyl groups such as vinyl, allyl, propenyl, iso-propenyl, butenyl, iso-butenyl and cyclohexenyl, aryl groups such as phenyl, tolyl, xylyl and naphthyl, aralkyl groups such as styrenyl, benzyl, phenylethyl and phenylpropyl and substituted hydrocarbon groups in which some hydrogen atoms of these hydrocarbon groups are replaced by halogen atoms including fluorine atoms and chlorine atoms, nitrile groups or the like such as chloromethyl, chloropropyl, bromoethyl, trifluoropropyl and cyanoethyl. Part (usually 1 mol % or less) of $R^1$ may be a hydroxyl group if particularly desired for imparting certain properties. A substituted or unsubstituted alkyl group, particularly a methyl group is preferred among these groups because of ease of synthesis, ease of handling, and an ability to impart adequate curability to the composition. Letter m which represents a degree of polymerization is an integer of at least 150, preferably from 150 to 10,000, more preferably from 200 to 10,000. If m is less than 150, the cured coating becomes brittle and would not follow deformation of the substrate. If m is too large, the composition before curing would have an increased viscosity to render handling less efficient. Two or more diorganopolysiloxanes may be used in combination if m is within the above-defined range and if desired.

Component (B) is a diorganopolysiloxane of the following general formula (2). The diorganopolysiloxane (B) does not contain a hydroxyl group attached to a silicon atom in a molecule and is effective for imparting lubricity and satisfactory wear resistance to a cured coating.

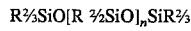
$$R^2{}_3SiO[R^2{}_2SiO]_nSiR^2{}_3 \qquad (2)$$

In formula (2), $R^2$ is a monovalent substituted or unsubstituted hydrocarbon group having 1 to 8, preferably 1 to 6 carbon atoms, examples of which are the same as described for $R^1$. Also a substituted or unsubstituted alkyl group, particularly a methyl group is a preferred $R^2$ group because of ease of synthesis. Letter n is an integer equal to or greater than m, and preferably in the range of 150 to 12,000, more preferably 200 to 10,000. Some of the above-mentioned advantages would be lost if n is smaller than m.

Preferably, component (B) is blended in amounts of 5 to 80 parts, more preferably 5 to 60 parts by weight per 100 parts by weight of component (A). With less than 5 parts of component (B) on this basis, the cured coating would be poor in lubricity and wear resistance. More than 80 parts of component (B) would reduce the mechanical strength of a cured coating and rather adversely affect wear resistance.

Component (C) is an organohydrogenpoly-siloxane having at least three hydrogen atoms, preferably from 3 to 100, more preferably from 3 to 50 each attached to a silicon atom in a molecule. It acts as a crosslinking agent by reacting with a hydroxyl group attached to a silicon atom in component (A) in the presence of a metal fatty acid salt as component (F) to thereby form a three-dimensional network structure. The molecular structure of component (C) is not critical and may be any of straight, branched, cyclic and three-dimensional structures.

The organohydrogenpolysiloxane may have the following compositional formula:

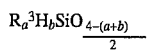
$$R_a{}^3H_bSiO_{\frac{4-(a+b)}{2}}$$

wherein $0.5<a<2$, $0.02 \leq b \leq 1$, and $0.7<a+b<3$. The organohydrogenpolysiloxane have 4 to 150 silicon atoms, preferably 4 to 100 silicon atoms in a molecule.

The organic group attached to a silicon atom in a molecule expressed by $R^3$ in the above general compositional formula is a monovalent substituted or unsubstituted hydrocarbon group having 1 to 8 carbon atoms exemplified by the same groups as those in $R^1$, and include alkyl groups such as methyl, ethyl, propyl, butyl and hexyl, alkenyl groups such as vinyl and allyl, aryl groups such as phenyl, aralkyl groups such as styrenyl, and substituted hydrocarbon groups in which some hydrogen atoms of these hydrocarbon groups are replaced by fluorine atoms, chlorine atoms, nitrile groups or the like. Some organic groups may be hydroxyl groups. A substituted or unsubstituted alkyl group, particularly a methyl group is especially preferred because of ease of synthesis.

Preferably, component (C) is blended in amounts of 1 to 30 parts, more preferably 2 to 25 parts by weight per 100 parts by weight of component (A). On this basis, less than 1 part of component (C) would promote curing to a less extent, failing to provide a necessary film strength. If the amount of component (C) exceeds 30 parts, there would be left excess Si—H bonds which can cause a change of physical properties with time.

Component (D) is an organosilane containing at least two alkoxy groups, preferably 2 to 3 alkoxy groups, each attached to a silicon atom and a substituted or unsubstituted amino group attached to a silicon atom through an alkylene group in a molecule, a partial hydrolyzate thereof, or a mixture of such an organosilane and a partial hydrolyzate thereof. It is effective not only for providing good adherence to the rubber substrate but also for imparting lubricity to the cured coating.

It should be noted that the partial hydrolyzate in component (D) and component (G) explained later means that the condensate obtained by partially hydrolyzing the silane so that at least two, preferably at least three of alkoxy groups are survived therein.

The alkoxy group preferably has 1 to 8 carbon atoms, more preferably 1 to 6 carbon atoms. Examples of the alkoxy group include methoxy, ethoxy, propoxy, isopropoxy, butoxy, isobutoxy, ter-butoxy, methoxyethoxy, and ethoxyethoxy groups, with the methoxy and ethoxy groups being preferred for ease of synthesis. The alkylene group preferably has 1 to 8 carbon atoms, more preferably 1 to 6 carbon atoms. Examples of the alkylene group include methylene, ethylene, propylene, and tetramethylene, hexamethylene, methylethylene groups, with the propylene group being preferred for storage stability and ease of synthesis. Examples of the substituted or unsubstituted amino group include amino group, an $C_1$–$C_8$ alkyl-substituted amino group such as methylamino and ethylamino groups, an aminoalkyl-substituted amino group such as β-aminoethylamino group, and an $C_7$–$C_{14}$ aralkyl-substituted amino group such as benzylamino group, and quaternary ammonium salts thereof in which some or all of the amino groups are changed to quaternary ammonium group. Examples of the substituted or unsubstituted amino group attached to a silicon atom through an alkylene group include aminomethyl, β-aminoethyl, γ-aminopropyl, δ-aminobutyl, γ-(methylamino)-propyl, γ-(ethylamino)propyl, γ-(β-amino-ethylamino)propyl, and γ-(benzylamino)propyl groups. The alkylene group is preferably a propylene group as in the γ-aminopropyl group when stability during storage is taken into account.

The organosilane may have an organic group attached to a silicon atom other than the alkoxy group and the substituted or unsubstituted aminoalkylene group. Examples of the organic group include a substituted or unsubstituted monovalent hydrocarbon group having 1 to 8 carbon atoms as exemplified by $R^1$, preferably an alkyl group such as a methyl group.

Exemplary organosilanes as component (D) are γ-aminopropyltrimethoxysilane, γ-aminopropyltriethoxysilane, N-β-(aminoethyl)-γ-aminopropyltrimethoxysilane, N-benzyl-γ-aminopropyltrimethoxysilane and partially hydrolyzed products thereof. Among these, γ-aminopropyltriethoxysilane and a partial hydrolyzate thereof are preferred.

Generally, component (D) is blended in amounts of 5 to 150 parts, preferably 10 to 100 parts, more preferably 20 to 80 parts by weight per 100 parts by weight of component (A). On this basis, less than 5 parts of component (D) would be too small to provide adhesion and lubricity. More than 150 parts of component (D) would hinder curing and reduce the mechanical properties of a cured coating.

Component (E) is a metal (Sn, Zn, Fe, etc.) salt of a fatty acid which is a catalyst for promoting dehydrogenation condensation reaction between a hydroxyl group in the both end hydroxyl-blocked diorganopolysiloxane as component (A) and a Si—H bond in the organohydrogenpolysiloxane as component (C). Examples include those having an organic group directly attached to a metal, such as dibutyltin diacetate, dibutyltin dioctoate, dibutyltin dilaurate, dibutyltin dioleate, dibutyltin distearate, tributyltin acetate, tributyltin octoate, tributyltin laurate, dioctyltin diacetate, dioctyltin dilaurate, diethyltin dioleate, and monomethyltin dioleate and those free of an organic group directly attached to a metal, such as zinc octanoate, iron octanoate, and tin octanoate.

Preferably, component (E) or fatty acid metal salt is blended in amounts of 0.5 to 15 parts, more preferably 0.6 to 10 parts by weight calculated as metal per 100 parts by weight of the total of components (A), (B) and (C). On this basis, less than 0.5 part of component (E) would provide less catalysis, resulting in short curing. More than 15 parts of component (E) would promote reaction too fast so that no appropriate pot life is available.

Component (F) is fine powder having a mean particle size of up to 50 μm. The powder is effective for eliminating luster from a cured coating of the composition, reducing the tackiness of a coating and improving the wear resistance of the cured coating. Exemplary are finely divided synthetic resins, for example, thermoplastic resins such as polycarbonate, nylon, polyethylene, Teflon®, polymethylsilses-quioxane, and polyacetal, finely divided rubbers, for example, synthetic rubber such as silicone rubber and finely divided inorganic materials, for example, metal oxides such as silica, zirconia and alumina. Polycarbonate is preferred among others.

The fine powder should have a mean particle size of up to 50 μm, preferably 0.3 to 50 μm, more preferably 1 to 30 μm. A powder with a mean particle size of more than 50 μm can reduce the mechanical strength and wear resistance of a cured coating. Particles with a mean particle size of less than 0.3 μm are sometimes difficult to manufacture and would provide no further advantages. The fine particles are preferably spherical or flake in shape although polygonal particles, odd shaped particles or fragments are acceptable. The particles are preferably colored black in outer appearance so that the coating may hide any discoloration of the underlying substrate.

Preferably, component (F) is blended in amounts of 2 to 40 parts, more preferably 5 to 30 parts by weight per 100 parts by weight of the total of components (A), (B) and (C). On this basis, less than 2 parts of component (F) would be too small to provide the desired effect whereas more than 40 parts would cause some deterioration of mechanical strength and a substantial loss of wear resistance of a cured coating.

In general, fine powder as component (F) contributes to improvements in matte and wear resistance when added to various curable coatings, for example, of urethane and silicone resin. However, fine powder has the drawback that when added to a coating composition, the fine powder itself has no adherence to the matrix resin and can be separated from the matrix resin upon receipt of repetitive frictional forces. The combined use of component (D) helps improve the adherence of fine powder to the matrix resin, thereby imparting long-lasting wear resistance to a cured coating.

In addition to the above components (A) to (F), the organopolysiloxane composition of the present invention preferably contains component (G) which is an organosilane containing at least two alkoxy groups, preferably 2 to 3 alkoxy groups, each attached to a silicon atom and a mercapto group attached to a silicon atom through an alkylene group in a molecule, a partial hydrolyzate thereof, or a mixture of such an organosilane and a partial hydrolyzate thereof. It is effective for providing good adherence to the rubber substrate when used in combination with component (D).

It should be noted that the partial hydrolyzate in component (G) means that the condensate obtained by partially hydrolyzing the silane so that at least two, preferably at least three of alkoxy groups are survived therein.

The alkoxy group preferably has 1 to 8 carbon atoms, more preferably 1 to 6 carbon atoms. Examples of the alkoxy group include methoxy, ethoxy, propoxy, isopropoxy, butoxy, isobutoxy, ter-butoxy, methoxyethoxy, and ethoxyethoxy groups, with the methoxy and ethoxy groups being preferred for ease of synthesis. The alkylene group preferably has 1 to 8 carbon atoms, more preferably 1 to 6 carbon atoms. Examples of the alkylene group include methylene, ethylene, propylene, and tetramethylene, hexamethylene, methylethylene groups, with the propylene group being preferred for storage stability and ease of synthesis.

The organosilane may have an organic group attached to a silicon atom other than the alkoxy group and the mercaptoalkylene group. Examples of the organic group include a substituted or unsubstituted monovalent hydrocarbon group having 1 to 8 carbon atoms as exemplified by $R^1$, preferably an alkyl group such as a metyl group.

Exemplary organosilanes as component (G) are γ-mercaptopropyltrimethoxysilane, γ-mercaptopropylmethyldimethoxysilane, and γ-mercaptopropyltriethoxysilane and partially hydrolyzed products thereof. Among these, γ-mercaptopropyltrimethoxysilane and a partial hydrolyzate thereof are preferred.

Preferably, component (G) is blended in amounts of 1 to 20 parts, more preferably 2 to 15 parts by weight per 100 parts by weight of component (A). On this basis, less than 1 part of component (G) would provide less adhesion. More than 20 parts of component (G) would provide no further advantages and the cured coating would sometimes be reduced in mechanical properties.

Any desired one or more of conventional additives and fillers may be added to the composition of the invention insofar as the objects of the invention are not impaired. For example, there may be blended reinforcing fillers such as fumed silica and precipitated silica, which may be treated to be hydrophobic, and non-reinforcing fillers such as silica aerogel, ground quartz, and diatomaceous earth. Various silicone resins and organic resins may also be used as the reinforcing filler. These fillers may be used alone or in admixture of two or more. The silicone resins used herein include silicone resins consisting essentially of a $R_3SiO_{1/2}$ unit and a $SiO_2$ unit and/or $RSiO_{3/2}$ unit, and silicone resins consisting of a $RSiO_{3/2}$ unit, with compounds having a ≡SiOH or ≡SiOR group in a molecule being preferred. R represents a substituted or unsubstituted monovalent hydrocarbon group preferably having 1 to 8 carbon groups as exemplified by $R^1$, particularly methyl, vinyl, phenyl and trifluoropropyl groups.

Also, inorganic pigments such as carbon black and iron oxide and UV absorbers such as carbon black and benzotriazole may be added to the composition of the invention.

Further, for adjusting the physical properties of a cured coating resulting from the composition of the invention, various silanes such as organo alkoxysilanes or partial hydrolyzates thereof may be added to the composition. Exemplary silanes are trimethoxy-silane, vinyltrimethoxysilane, triethoxysilane, vinyltriethoxysilane, tetramethoxysilane, tetraethoxysilane, and tetra(n-propoxy)silane. Silane coupling agents such as γ-glycidoxy-propyltrimethoxysilane and γ-methacryloxy-propyltrimethoxysilane or partial hydrolyzates thereof may also be added for improving adhesion to the substrate. Also useful are a reaction product (i.e. an reaction product of amino group with epoxy group) of an amino group-containing organo alkoxysilane selected from the group consisting of γ-aminopropyltrimethoxysilane, γ-aminopropyltriethoxysilane, N-β-(amino-ethyl)-γ-aminopropyltrimethoxysilane, and N-benzyl-γ-aminopropyltrimethoxysilane with an epoxy group-containing organo alkoxysilane such as γ-glycidoxypropyltrimethoxysilane or a partial hydrolyzate thereof, and a reaction product (i.e. an reaction product of amino group with (meth)acryloxy group) of an amino group-containing organo alkoxy silane selected from the group consisting of γ-aminopropyl-trimethoxysilane, γ-aminopropyltriethoxysilane, and N-benzyl-γ-aminopropyltrimethoxysilane with an acryloxy group or methacryloxy group-containing organo alkoxysilane such as γ-acryloxypropyltrimethoxysilane, γ-methacryloxypropyltrimethoxysilane or a partial hydrozate thereof. These adhesion promoters may be used alone or in admixture of two or more.

In treating various rubber substrates with the composition of the invention, the composition may be used as such or in dilution with organic solvents. The organic solvents used herein include n-hexane, n-heptane, cyclo-hexane, industrial gasoline, petroleum naphtha, iso-paraffin, benzene, toluene, xylene, isopropyl alcohol, butyl alcohol, cyclohexanone, methyl ethyl ketone, and mixtures thereof. Preferred among others are industrial gasoline, petroleum naphtha, and iso-paraffin and mixtures of one or more of them with isopropyl alcohol. The amount of organic solvent used is suitably selected in accordance with the viscosity desired for the composition on application.

The composition of the invention can be readily prepared by uniformly mixing the above-mentioned components. In a preferred practice, a mixture of components (A), (B), (C), (F), and (G), component (D), and component (E) are stored separately and these three are admixed on use.

Various rubber substrates are treated with the composition of the invention by the following methods. The composition can be applied to a surface of the substrate by dipping, spraying, brushing, knife coating, and roll coating. As previously mentioned, the composition may be used as such or after it is diluted with an organic solvent into a solution. The coating may be cured by allowing it to stand at room temperature or by some heating, for example, heating at a temperature of 60° to 200° C. for 30 seconds to 30 minutes.

When various rubber substrates including natural rubbers and synthetic rubbers such as SBR, NBR, chloroprene, IIR, EPDM, urethane rubber and chlorosulfonated polyethylene are treated with the composition of the invention, the composition produces a cured coating having satisfactory non-tackiness to another substance, water repellency, lubricity and wear resistance. The preferable rubber substrate used herein is synthetic rubber, typically EPDM (ethylene-propylene copolymer) sponge and it may be coated with the composition by any conventional technique such as spray coating.

The inventive composition yields a cured coating having improved wear resistance as compared with conventional organopolysiloxane compositions. It is suitable for use in applications where repetitive frictional forces are applied for a long term, for example, as a surface treating agent for automotive weather strips and vibration damping rubber.

There has been described an organopoly-siloxane composition which can impart non-tackiness, water repellency, lubricity and wear resistance to rubber surface. It is particularly suitable for surface treatment to form a durably wear resistant coating on rubber surface.

EXAMPLE

Examples of the invention are given below by way of illustration and not by way of limitation. All parts are by weight.

EXAMPLES 1 AND 2

To 1,300 parts of industrial gasoline No. 2 were added and dissolved 100 parts of a both end hydroxyl-blocked dimethylpolysiloxane of the following average formula (a) and 15 parts of a dimethylpolysiloxane of the following average formula (b).

$$HO(CH_3)_2SiO[(CH_3)_2SiO]_{5998}Si(CH_3)_2OH \qquad (a)$$

$$(CH_3)_3SiO[(CH_3)_2SiO]_{5998}Si(CH_3)_3 \qquad (b)$$

To this solution were added 5 parts of a methylhydrogenpolysiloxane of the following average formula (c) and 20 parts of spherical particles of polycarbonate resin having a mean particle size of 20 μm.

$$(CH_3)_3Si[(CH_3)HSiO]_{48}Si(CH_3)_3 \qquad (c)$$

The mixture was agitated and mixed. To this powder dispersion were added 200 parts of 30% by weight γ-aminopropyltriethoxysilane isopropyl alcohol solution. The mixture was agitated and mixed again. Finally, 20 parts of a 50 wt % toluene solution of dibutyltin diacetate was added and mixed, obtaining an industrial gasoline solution of a treating composition (Example 1).

The same procedure as Example 1 was repeated except that the amount of the both end hydroxyl-blocked dimethylpolysiloxane was changed from 100 parts to 70 parts and 30 parts of a both end hydroxyl-blocked dimethylpolysiloxane of the following average formula (d) was used, obtaining an industrial gasoline solution of a treating composition (Example 2).

$$HO(CH_3)_2SiO[(CH_3)_2SiO]_{448}Si(CH_3)_2OH \qquad (d)$$

Next, each of the treating solutions prepared in Examples 1 and 2 was spray coated to a surface of EPDM sponge. The coatings were dried for 5 minutes and heated at 150° C. for 2 minutes to form hard cured coatings of 5 μm thick. The coatings were tack-free and smooth to slide on. The coatings were subject to an abrasion test (slide abrasion test) under the following conditions.

| Test conditions | |
| --- | --- |
| Test machine: | reciprocating abrasion tester |
| Abrasion element: | glass plate of 5 mm thick |
| Load: | 200 g |

Test conditions

| | |
|---|---|
| Stroke: | 100 mm |
| Abrasion cycle: | 30 cycles/min. |

The results are shown in Table 1.

COMPARATIVE EXAMPLES 1 AND 2

A treating solution was prepared by the same procedure as in Example 1 except that the polycarbonate powder was omitted. It was similarly applied to EPDM sponge by coating and heat curing, to form a cured film on the EPDM sponge surface. The coating was subject to the same abrasion test as in Example 1. (Comparative Example 1)

A treating solution was prepared as in Comparative Example 1 except that 15 parts of the dimethylpolysiloxane of formula (B) was replaced by 15 parts of a dimethylpolysiloxane of the following average formula (e).

$$(CH_3)_3SiO[(CH_3)_2SiO]_{1498}Si(CH_3)_3 \qquad (e)$$

It was similarly applied to EPDM sponge by coating and heat curing, to form a cured film on the EPDM sponge surface. The coating was subject to the same abrasion test as in Example 1. (Comparative Example 2)

The results are shown in Table 1.

COMPARATIVE EXAMPLES 3 TO 4

A treating solution was prepared by the same procedure as in Example 2 except that the polycarbonate powder was omitted. It was similarly applied to EPDM sponge by coating and heat curing, to form a cured film on the EPDM sponge surface. The coating was subject to the same abrasion test as in Example 1. (Comparative Example 3)

A treating solution was prepared as in Comparative Example 3 except that 15 parts of the dimethylpolysiloxane of formula (b) was replaced by 15 parts of the dimethylpolysiloxane of formula (e). It was similarly applied to EPDM sponge by coating and heat curing, to form a cured film on the EPDM sponge surface. The coating was subject to the same abrasion test as in Example 1. (Comparative Example 4)

The results are shown in Table 1.

TABLE 1

| Abrasion test | Cycles | Evaluation |
|---|---|---|
| Example 1 | 55,000 | OK |
| Comparative Example 1 | 30,000 | NG |
| Comparative Example 2 | 20,000 | NG |
| Example 2 | 60,000 | OK |
| Comparative Example 3 | 35,000 | NG |
| Comparative Example 4 | 20,000 | NG |

The coating was evaluated for abrasion by inspecting it on every 5,000 cycles. The number of cycles means that the cured coating was resistant against abrasion until the indicated number of cycles. For example, 55,000 cycles means that the coating was abraded away between 55,000 and 60,000 cycles.

EXAMPLES 3 AND 4

To 1,000 parts of industrial gasoline No. 2 were added and dissolved 100 parts of a both end hydroxyl-blocked dimethylpolysiloxane of the following average formula (a) and 15 parts of a dimethylpolysiloxane of the following average formula (b).

$$HO(CH_3)_2SiO[(CH_3)_2SiO]_{5998}Si(CH_3)_2OH \qquad (a)$$

$$(CH_3)_3SiO[(CH_3)_2SiO]_{5998}Si(CH_3)_3 \qquad (b)$$

To this solution were added 5 parts of a methylhydrogenpolysiloxane of the following average formula (c) and 20 parts of spherical particles of polycarbonate resin having a mean particle size of 20 μm.

$$(CH_3)_3Si[(CH_3)HSiO]_{48}Si(CH_3)_3 \qquad (c)$$

The mixture was agitated and mixed. To this powder dispersion were added 5 parts of γ-mercaptopropyltrimethoxysilane and 35 parts of γ-aminopropyltriethoxysilane. The mixture was agitated and mixed again. Finally, 20 parts of a 50 wt % toluene solution of dibutyltin diacetate was added and mixed, obtaining an industrial gasoline solution of a treating composition (Example 3).

The same procedure as Example 3 was repeated except that the amount of the both end hydroxyl-blocked dimethylpolysiloxane was changed from 100 parts to 70 parts and 30 parts of a both end hydroxyl-blocked dimethylpolysiloxane of the following average formula (d) was used, obtaining an industrial gasoline solution of a treating composition (Example 4).

$$HO(CH_3)_2SiO[(CH_3)_2SiO]_{448}Si(CH_3)_2OH \qquad (d)$$

Next, each of the treating solutions prepared in Examples 3 and 4 was spray coated to a surface of EPDM sponge. The coatings were dried for 5 minutes and heated at 150° C. for 2 minutes to form hard cured coatings of 5 μm thick. The coatings were tack-free and smooth to slide on. The coatings were subject to the same abrasion test (slide abrasion test) as in Example 1. The results are shown in Table 2.

COMPARATIVE EXAMPLES 5 AND 6

A treating solution was prepared by the same procedure as in Example 3 except that the polycarbonate powder was omitted. It was similarly applied to EPDM sponge by coating and heat curing, to form a cured film on the EPDM sponge surface. The coating was subject to the same abrasion test as in Example 1. (Comparative Example 5)

A treating solution was prepared as in Comparative Example 5 except that 15 parts of the dimethylpolysiloxane of formula (B) was replaced by 15 parts of a dimethylpolysiloxane of the following average formula (e).

$$(CH_3)_3SiO[(CH_3)_2SiO]_{1498}Si(CH_3)_3 \qquad (e)$$

It was similarly applied to EPDM sponge by coating and heat curing, to form a cured film on the EPDM sponge surface. The coating was subject to the same abrasion test as in Example 1. (Comparative Example 6)

The results are shown in Table 2.

COMPARATIVE EXAMPLES 7 and 8

A treating solution was prepared by the same procedure as in Example 4 except that the polycarbonate powder was omitted. It was similarly applied to EPDM sponge by coating and heat curing, to form a cured film on the EPDM sponge surface. The coating was subject to the same abrasion test as in Example 1. (Comparative Example 7)

A treating solution was prepared as in Comparative Example 7 except that 15 parts of the dimethylpolysiloxane of formula (b) was replaced by 15 parts of the dimethylpolysiloxane of formula (e). It was similarly applied to EPDM sponge by coating and heat curing, to form a cured film on the EPDM sponge surface. The coating was subject to the same abrasion test as in Example 1. (Comparative Example 8)

COMPARATIVE EXAMPLES 9–10

A treating solution was prepared by the same procedure as in Example 3 except that 15 parts of the dimethylpolysiloxane (b) was replaced by 15 parts of the dimethylpolysiloxane (e) (Comparative Example 9).

A treating solution was prepared by the same procedure as in Example 4 except that 15 parts of the dimethylpolysiloxane (b) was replaced by 15 parts of dimethylpolysiloxane (e) (Comparative Example 10).

The results are shown in Table 2.

TABLE 2

| Abrasion test | Cycles | Evaluation |
|---|---|---|
| Example 3 | 55,000 | OK |
| Comparative Example 5 | 30,000 | NG |
| Comparative Example 6 | 20,000 | NG |
| Example 4 | 60,000 | OK |
| Comparative Example 7 | 35,000 | NG |
| Comparative Example 8 | 20,000 | NG |
| Comparative Example 9 | 40,000 | NG |
| Comparative Example 10 | 45,000 | NG |

The coating was evaluated for abrasion by inspecting it on every 5,000 cycles. The number of cycles means that the cured coating was resistant against abrasion until the indicated number of cycles. For example, 55,000 cycles means that the coating was abraded away between 55,000 and 60,000 cycles.

Japanese Patent Applications No. 5-250159 and No.7-91865 incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. An organopolysiloxane composition comprising (A) 100 parts by weight of a diorgano-polysiloxane of the following general formula:

   $$HOR^1_{1/2}SiO[R^1_{1/2}SiO]_m SiR^1_{1/2}OH \quad (1)$$

wherein $R^1$ is a monovalent substituted or unsubstituted hydrocarbon group and letter m is an integer of at least 150, (B) 5 to 80 parts by weight of a diorganopolysiloxane of the following general formula:

   $$R^2_{2/3}SiO[R^2_{2/3}SiO]_n SiR^2_{2/3} \quad (2)$$

wherein $R^2$ is a monovalent substituted or unsubstituted hydrocarbon group and letter n is an integer equal to or greater than m, (C) 1 to 30 parts by weight of an organohydrogenpolysiloxane having at least three hydrogen atoms each attached to a silicon atom in a molecule, (D) 5 to 150 parts by weight of an organosilane containing at least two alkoxy groups each attached to a silicon atom and a substituted or unsubstituted amino group attached to a silicon atom through an alkylene group in a molecule, a partial hydrolyzate thereof, or a mixture thereof, (E) 0.5 to 15 parts by weight of a metal salt of a fatty acid, and (F) 2 to 40 parts by weight of fine powder having a mean particle size of up to 50 μm, wherein the fine powder is selected from the group consisting of finely divided synthetic resins, finely divided rubbers and finely divided inorganic materials.

2. The organopolysiloxane composition of claim 1 which further comprises (G) 1 to 20 parts by weight of an organosilane containing at least two alkoxy groups each attached to a silicon atom and a mercapto group attached to a silicon atom through an alkylene group in a molecule, a partial hydrolyzate thereof, or a mixture thereof.

3. A rubber substrate having a coating of a cured product of the organopolysiloxane composition of claim 1.

4. A rubber substrate having a coating of a cured product of the organopolysiloxane composition of claim 2.

* * * * *